Dec. 9, 1958
J. L. GANTZ
2,863,473
BALANCED VALVE
Filed Feb. 28, 1955
3 Sheets-Sheet 1
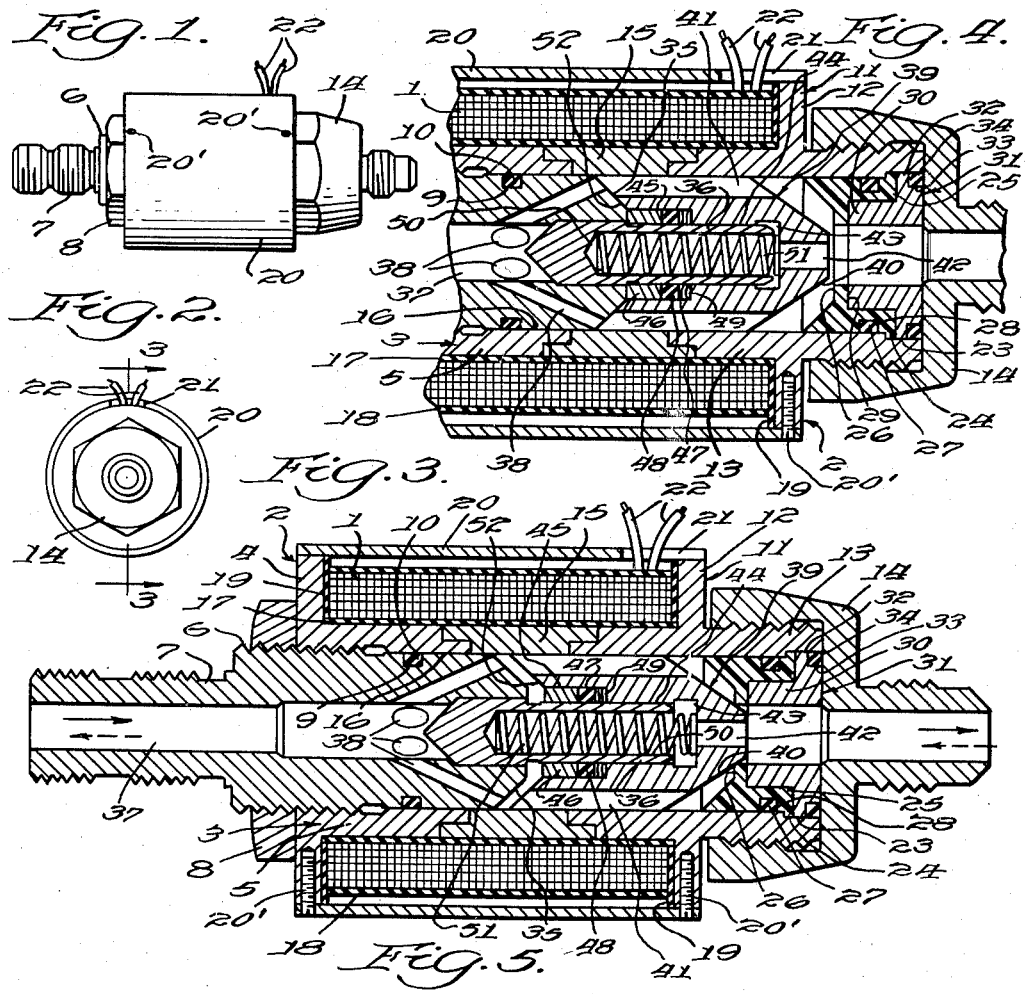
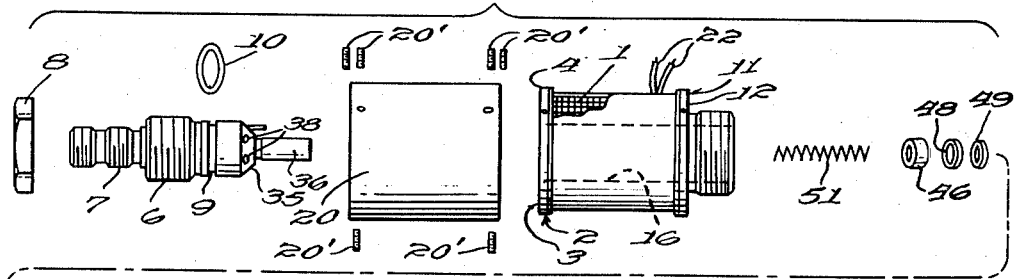
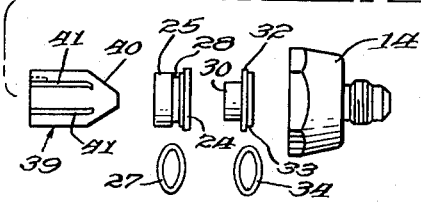
INVENTOR.
Jack L. Gantz.
BY
Harold J. LeVesconte
Atty.

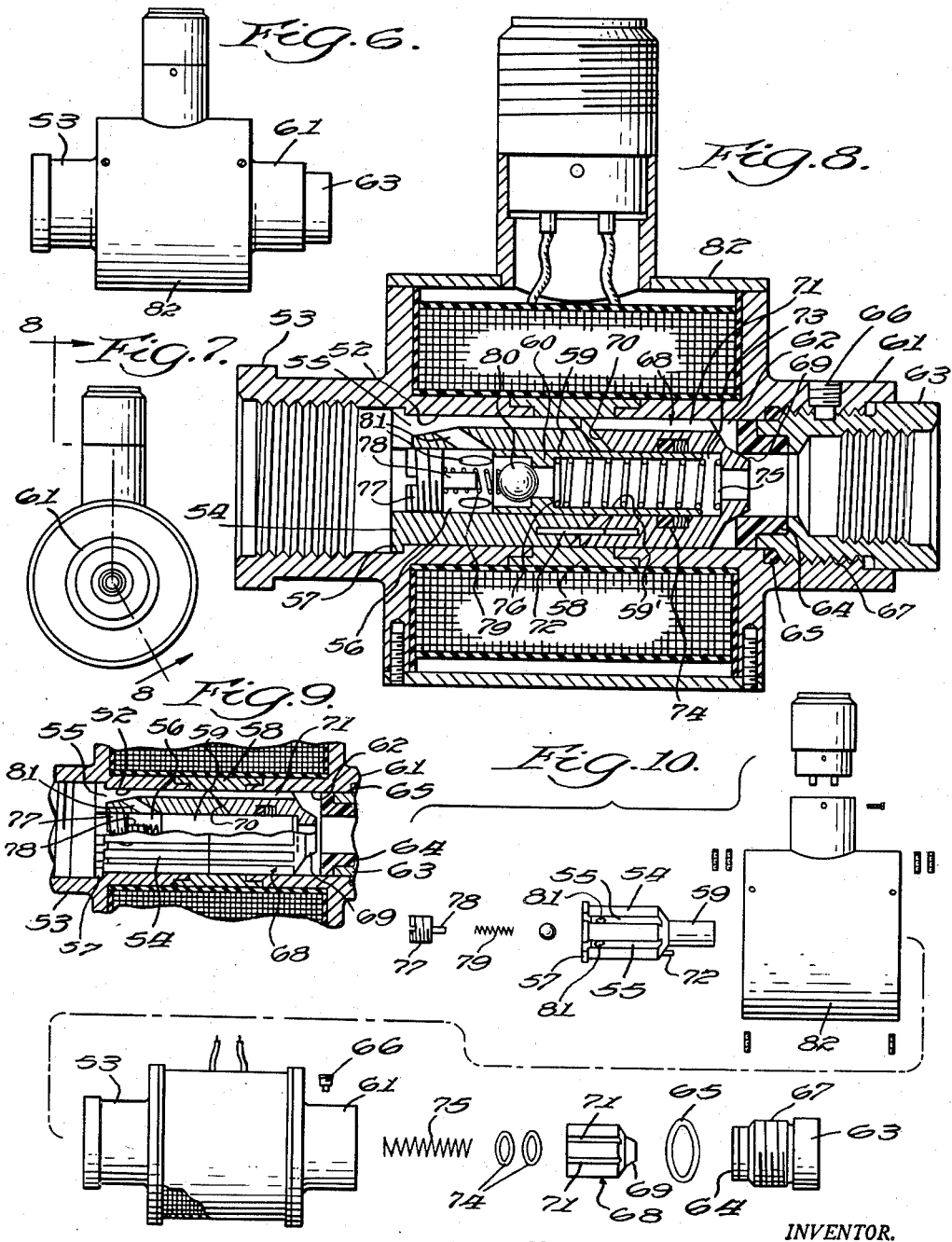

Dec. 9, 1958  J. L. GANTZ  2,863,473
BALANCED VALVE
Filed Feb. 28, 1955  3 Sheets-Sheet 3
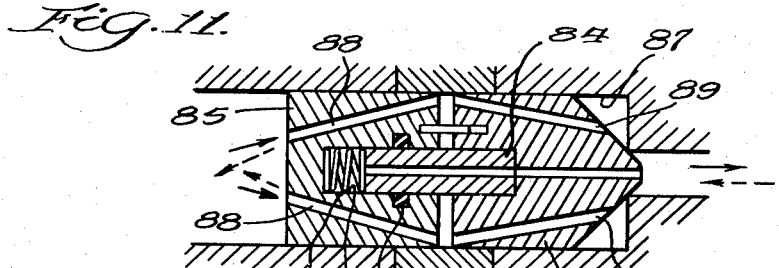
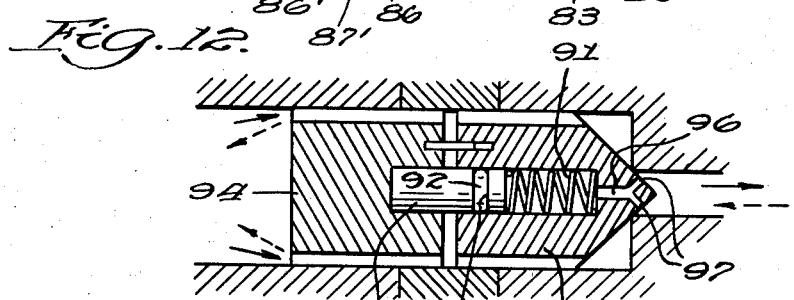
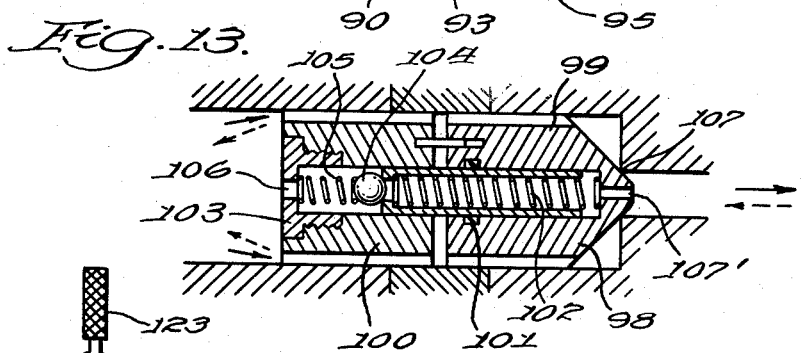
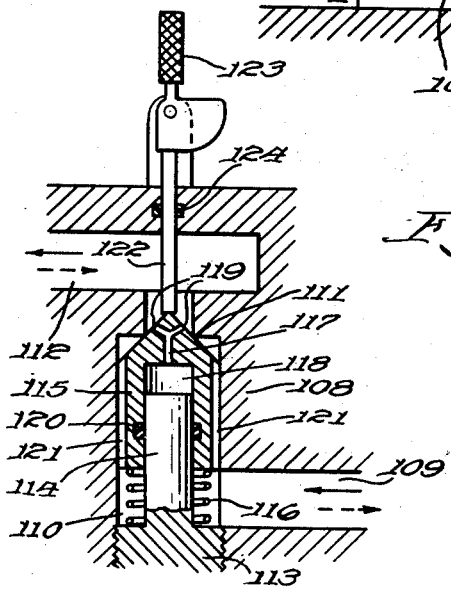
INVENTOR.
Jack L. Gantz.
BY
Harold J. LeVesconte
Atty.

United States Patent Office 2,863,473
Patented Dec. 9, 1958

2,863,473

BALANCED VALVE

Jack L. Gantz, Encino, Calif., assignor, by mesne assignments, to Vincent W. Eckel, Northridge, Calif.

Application February 28, 1955, Serial No. 490,810

15 Claims. (Cl. 137—599.2)

This invention relates to valves and more particularly to an improved form of balanced valve characterized by ease of operation in the presence of extreme pressures.

The principal object of the invention is to provide a balanced fluid flow controlling valve having means for balancing the pressure with resultant decreased requirements of actuating effort to operate the valve in the presence of extreme pressures.

Another object of the invention is to provide a balanced, solenoid operated valve characterized by simple construction and light weight whereby it is suitable for use in aircraft systems.

Still another object of the invention is to provide a fluid flow controlling valve in which the valve element is subjected to balanced pressures and which is susceptible of either manual or solenoid operation.

A further object of the invention is to provide a balanced valve for controlling fluid flow having a valve element comprising a solenoid operated armature which when subjected to magnetic flux by the solenoid moves to a position closing the flux path with resultant reduction of the size of coil required for a given amount of effort and consequent better adaptation of the valve for use on aircraft.

With the foregoing objects in view, together with such additional objects and advantages as shall subsequently appear, the invention resides in the parts and in the construction, combination and arrangement of parts disclosed, by way of example, in the following specification of presently preferred modes of execution of the invention; reference being had to the accompanying drawings which form a part of said specification and in which drawings:

Fig. 1 is a side elevation of a valve embodying one mode of execution of the invention, Fig. 2 is an elevational view of the right hand end of Fig. 1, Fig. 3 is an enlarged, medial sectional view taken on the line 3—3 of Fig. 2 and showing the valve in closed position, Fig. 4 is a fragmentary view similar to Fig. 3 but showing the valve in open position, Fig. 5 is an exploded view of the component parts of the valve shown in Figs. 1 through 4, Fig. 6 is a side elevation of a second form of the invention, Fig. 7 is an elevational view of the right hand end of Fig. 6, Fig. 8 is an enlarged, substantially medial sectional view taken on the line 8—8 of Fig. 7 showing the valve in closed position, Fig. 9 is a fragmentary sectional view taken on the line 8—8 of Fig. 7 on a lesser scale than Fig. 8 showing the valve in open position, Fig. 10 is an exploded view of the parts comprising the valve shown in Figs. 6 through 9, Fig. 11 is a medial sectional view showing a first modification of the valve element construction usable in a valve of the type shown in Figs. 1 through 4, Fig. 12 is a medial sectional view showing a second valve construction usable in a valve such as shown in Figs. 1 through 4, Fig. 13 is a medial sectional view showing a modification of the valve structure usable in a valve such as shown in Figs. 6 through 9, and Fig. 14 shows a structure embodying the balancing principles of the invention applied to a manually operated valve.

In general, the solenoid construction disclosed embodies the principles of construction and operation disclosed in the application of Vincent W. Eckel Serial No. 267,178 filed January 18, 1952 which has been refiled in pending application, Serial No. 661,837 on May 27, 1957 and is employed because of its superior efficiency; certain refinements thereof to be later described in detail serving to further increase the efficiency thereof.

Referring first to Figs. 1 through 5 the operating coil 1 is wound upon a spool like valve body generally indicated at 2 and comprising a first body member 3 formed of paramagnetic material including an end flange 4 and a hollow tubular member 5 the outer end of which is internally threaded to receive the threaded portion 6 of an inlet nipple end member 7 also formed of paramagnetic material; said nipple being held in longitudinally adjusted position by a lock nut 8 and having an annular groove 9 disposed inwardly beyond the threaded portion 6 in which an O-ring 10 is carried engaging the inner periphery of the tubular member 5 with resultant formation of a fluid tight seal. A second body member 11 is formed of paramagnetic material and includes a flange 12 and a hollow tubular member 13 extending inwardly and outwardly from the flange; the outward portion being externally threaded for engagement with an outlet nipple 14 later to be described in more detail.

The inwardly projecting hollow, tubular members 5 and 13 are of the same external diameter and terminate in spaced relation. A ring 15 of non-magnetic material is brazed or welded to the adjacent ends of the members 5 and 13 with resultant formation of a centrally disposed bore 16 extending through the valve body. The flanges 4 and 12 are of the same outer diameter and combine with the outer diameters of the members 5 and 13 and the ring 15 to form a spool upon which the solenoid coil 1 is wound; said coil being surrounded by insulating material comprising an inner sleeve 17, an outer cover 18 and end rings 19, 19. The outer edges of the flanges 5 and 13 are connected by a covering sleeve 20 formed of paramagnetic material and secured thereto by any suitable means such as screw pins 20', and further being provided with an opening 21 through which the leads 22 extend for connection to a source of electrical energy.

The outer end of the bore 16 formed by the body member is provided with a counterbore 23 in which is located the flange 24 of an annular valve seat member 25 which extends into the bore from said flange and terminates in a valve seat shoulder 26. An O-ring 27 seated in a groove 28 on the outer surface of the valve seat member provides a fluid seal between the bore and valve seat member. According to operating requirements, the valve seat may be either metal or non-metallic. The valve seat member 25 is provided with a counterbore 29 extending from the outer end thereof to a point adjacent the shoulder 26 and disposed in this counterbore is the body portion 30 of an annular retainer member 31 the innermost end of which engages the bottom of the counterbore 29 and thus reinforces the valve seat member. The retainer member is provided with a head portion 32 which closely fits the bore 16 and the outer end thereof is provided with a reduced diameter portion 33 which combines with the inner wall of the outlet nipple 14 to form a groove for an O-ring gasket 34. The screwing on of the outlet nipple thus secures the valve seat and retainer members in position and the O-rings 27 and 34 serve to prevent the escape of fluid except through the passage way formed by the valve seat member, the retainer member and the nipple.

The inlet nipple and end member 7 extends into the bore 16 beyond the O-ring 10 and terminates in a blunt frusto-conical inner end surface 35 and brazed or similarly secured in the said inner end surface in the axial line thereof is a balance rod 36; said rod being formed of non-magnetic material and having an outer diameter equal to that of the valve seat 26. The nipple 7 is provided with an axial bore 37 which extends from the outer end thereof to a point adjacent the end of the balance rod 36 and from the inner end of said bore a plurality of fluid conducting channels 38 extend angularly outwardly and emerge in the frusto-conical face 35. In this connection it is to be noted that the end of the end member 7 is at about the plane containing the mid-length of the non-magnetic ring 15. Mounted for reciprocation in the bore 16 on the rod 36 is a poppet type valve member 39 formed of paramagnetic material and having a frusto-conical surface 40 adapted to engage the valve seat shoulder 26; said poppet closely fitting the bore 16 and having a series of longitudinally extending channels 41 extending along its outer surface. The poppet 39 is provided with an axial bore extending therethrough; said bore including a fluid entrance and exit port portion 42 a larger portion 43 which is slightly larger in diameter than the valve seat, a bore 44 closely slidably fitting the exterior of the rod 36 and including an enlarged counterbored end portion 45 into which a ring 46 is press fitted with resultant formation of a groove 47 in which an O-ring 48 and an associated back-up ring 49 are disposed to prevent fluid leakage between the poppet and the rod. The rod 36 includes an axially disposed bore 50 extending from the free end thereof toward the end member 7 in which is housed a compression spring 51 having one end thereof engaging the bottom of said bore and the other end engaging the poppet 39 at the shoulder formed by the portions 42 and 43 of the bore therein and constantly effective to urge the poppet 39 into engagement with the valve seat. The inner end face 52 of the poppet 39 is provided with a frusto-conical concavity complementary to the frusto-conical end face 35 of the nipple 7 to effectively decrease the length of the flux path.

Upon energization of the coil 1 a torodial form of magnetic flux path will be created flowing outwardly along the body member 3 and so much of the end member 7 as extends into the body member 3, thence outwardly radially through the flange 4, thence along the sleeve 20 to the flange 12, thence radially inwardly through the flange 12 to the tubular member 13. The non-magnetic ring 15 interrupts this circuit but the magnetic poppet 39 provides a by-pass for the flux and carries it to the air gap between the adjacent ends of the poppet and the end 35 of the end member 7 and will draw the poppet into engagement with the end 35 with consequent opening of the valve against the resistance of the spring 51.

For aircraft hydraulic systems operating at pressures of 3,000 p. s. i., any valve construction which is not balanced requires such effort to operate against pressure as to prohibit the use of solenoids due to weight and power requirements and to require fluid pressure operated or manually operated valves. In the present invention, the poppet 39 is, in effect, a cylinder having uniform inside and outside diameters, the inside diameter being the same as the diameter of the valve seat and the engagement of the poppet and valve seat being essentially a line contact by reason of the conical face of the poppet and the corner of the valve seat engaged thereby. With respect to inlet pressure, it is to be noted that when the poppet is in closed position, the pressure against the inner end of the poppet extends to the outer surface of the balance rod 36 and since this rod is of the same diameter as the valve seat, the pressure will be balanced against both ends of the poppet; the only unbalancing force being the force exerted by the spring 51 tending constantly to move the poppet into closed position. At the same time, with respect to back pressure on the outlet side of the valve, the fluid entering the port 42 into the interior of the rod 36 will create a counter pressure against the area of the end of the rod 36 and since this is of the same area as the port formed by the valve seat, the forces of such pressure are also in balance except for the force applied by the spring 51. Thus, unless some external force is applied to overcome the spring bias and unseat the poppet, fluid pressure in either direction is ineffective to unseat the poppet. This external force needs only to be enough to unseat the poppet with compression of the spring 51 and since the spring does not need to oppose pressure derived forces, the spring can be a relatively light spring needing only sufficient strength to move the poppet as quickly as may be required for a particular installation. Because of the small amount of effort required to operate the poppet against the spring bias, the solenoid coil can be of small size and light weight resulting finally in a valve of great capacity and light weight which is highly desirable for use on aircraft.

In connection with the opening of the valve it is particularly to be noted that since the balance rod 36 is formed of non-magnetic material, the flux path entering the poppet 39 will find its best path across the gap between the adjacent ends of the valve member and the end 35 of the end member 7 which constitute the magnet poles and that the mating frusto-conical faces of these poles permits reduction in the effective width of the gap and resultant required coil size while permitting a longer movement of the poppet to close the gap. Also by adjustment of the end member 7 through its threaded connection with the body member 4 the width of the gap may be varied to suit particular requirements. While the inlet and outlet nipple members are shown with external threads for connection in a fluid line, it will be understood that this means of connection may be of any suitable type useful for that purpose. Additionally, while the end member 7 and nipple 14 have been designated as "inlet" and "outlet," respectively, it will be appreciated that due to the fact that the poppet is separately pressure balanced from both sides of the valve seat, the above described valve will operate equally well with fluid flow from the nipple 14 toward the end member 7.

Referring next to Figures 6 through 10, there is shown a second embodiment of the invention particularly adapted for normal flow in one direction with provision for accommodating reverse flow without unseating the poppet. In this form of the invention, the general arrangement of the solenoid coil and the supporting and magnetic circuit forming means is essentially the same as in the first described form, comprising a coil supporting spool structure including paramagnetic members forming the ends of the spool and the end portions of the fluid passage through the valve; the inner ends of the members being interconnected by a non-magnetic ring. Press fitted into the bore 52 in the inlet member 53 is an end member 54 formed of paramagnetic material having a series of longitudinally extending grooves 55 extending along its outer face and having an axially disposed bore 56 extending therethrough; said end member having a locating shoulder flange 57 at its outer end and having its inner end terminating in a frusto-conical end face disposed substantially in the plane defining the mid-length of the non-magnetic ring 58. Brazed or otherwise secured in the bore 56 and projecting beyond the inner end of the end member 54 is a balance rod 59 formed of non-magnetic material; said rod having an axial bore 59' therethrough with a reduced diameter portion 60 adjacent the end thereof disposed within the end member 54. The outlet member 61 is provided with a bore 62 forming a continuation of the bore 52 and at the outer end thereof is internally threaded. Mounted in the threaded portion thereof is a bushing 63 having a valve seat member 64 at the inner end thereof; the outer end of said bushing being internally threaded for connection to a fluid line. Interposed between the inner end of the externally threaded portion of the bushing 63 and the adjacent surface of the outlet member 61 is an O-ring 65 effective to prevent fluid leakage therebetween. The outlet member 61 is further provided with a set screw 66 engageable with the externally threaded portion 67 of the bushing 63 effective to lock it in adjusted position. It will be noted that by the threaded engagement between the bushing and outlet member, the distance between the end of the end member and the valve seat may be varied. Slidably mounted on the rod 59 and reciprocable thereon between the valve seat member 64 and the inner end of the end member is a poppet 68 having a frusto-conical end 69 engageable with the valve seat member and an inner end 70 of concave frusto conical configuration conforming to the adjacent end of the end member 54; said poppet closely slidably fitting the bore 62 and having a series of longitudinally extending grooves 71 on its outer surface forming continuations of the grooves 55 on the end member. A pin 72 extending outwardly longitudinally from the inner face of the stop member loosely slidably engages a socket in the poppet and serves to keep the poppet with the grooves thereon in alignment with the grooves on the end member. The poppet has an axial bore extending therethrough comprising a larger portion 73 closely fitting the exterior of the rod 59 having an annular recess formed therein in which a sealing gasket means 74 is disposed to prevent fluid leakage between the rod and poppet and said bore at the valve seat engaging end being reduced in diameter to provide a shoulder for one end of a compression spring 75 which is disposed in the bore 59' and having its other end abutting the shoulder 76 formed by the adjacent side of the reduced diameter portion 60 of said bore; said spring operating to urge the poppet into engagement with the valve seat member 64.

The outer end of the bore 56 is internally threaded for reception of a screw 77 having a cylindrical projection 78 at the inner end thereof on which is disposed one end of a compression spring 79 which at its other end engages a ball 80 seated at the end of the reduced bore 60 opposite that engaged by the spring 75 and serves to hold said ball yieldingly seated thereon. The end member 54 is provided with a series of ports 81 extending from the bore 56 beyond the end of the rod 59 angularly outwardly toward the inlet end thereof and terminating in the grooves 55.

The magnetic circuit is the same as in the first described valve, flowing out through the flange of the inlet member, along the paramagnetic coil cover 82, inwardly along the flange of the outlet member and thence inwardly along the portion thereof disposed within the coil and thence to the poppet and up to the gap between the adjacent ends of the poppet and the end member, causing the poppet to move against the bias of the spring 75 to open position as shown in Fig. 9. When open, the fluid flow entering the inlet member flows along the grooves 55 and 71 thence through the valve seat into the outlet member bushing and to the point of use. It is to be noted that the external diameter of the rod 59 is the same as the diameter of the valve seat, wherefore, all pressure at the inlet side of the valve seat is balanced against the exterior end surfaces of the poppet and all pressure against the poppet from the outlet side of the valve seat is balanced by reason of the fact that the valve member end surface area exposed through the valve seat is equal to the opposing area inside the poppet adjacent the opening therein through which outlet pressure is conducted to the interior of the valve. Thus the poppet is balanced against being displaced by excessive outlet pressure and against requiring excessive opening force due to inlet pressure. Regardless of the extent of inlet pressure, the same force from the coil will move the valve to open position, and regardless of the extent of back pressure, the valve will remain closed until the valve member is operated by energization of the solenoid coil. The coil need be only strong enough to overcome the bias of the spring 75 with current of the characteristics that may be available.

This second embodiment of the invention includes provision for the relief of excess back pressure in the spring biased ball check valve member 80. In the event of excess back pressure the fluid will flow through the interior of the poppet and rod 59 and unseat the valve 80 and thence pass through the ports 81 to the inlet side of the valve.

Both of the above described embodiments of the invention further achieve a reduction of the size of operating coil by reason of locating the poppet so that the gap between its end as a moving pole and the stationary pole piece at the point at which there is the greatest concentration of the lines of magnetic force as disclosed in the said prior application of Vincent W. Eckel with the further decrease in the reluctance factor by reason of the angular disposition of the mating faces of the said pole pieces.

Figs. 11, 12 and 13 illustrate other arrangements of the valve which also involve the principle of balancing a poppet against pressure on both sides of the valve seat all of which are capable of operation by the above described solenoid means; the latter having been previously described in sufficient detail, being omitted to avoid repetition. In Fig. 11 the poppet 83 carries the balance rod member 84 which slidingly engages the stationary end member 85; an O-ring 86 serving to prevent leakage and a spring 86' interposed between the end of the balance rod 84 and the end of the bore 87 in which it reciprocates providing the required closing bias. The poppet and rod are provided with an axial bore 87' to allow balancing pressure from the conduit beyond the valve seat to effect a balance and since the end areas of the poppet exteriorly of the valve seat are also equal, the valve is balanced against pressure on that side of the valve seat. Means for fluid flow are here shown as ports 88 in the end member and ports 89 in the poppet, but it will be appreciated that grooves along the exterior of these members as shown in Fig. 10 may be used equally well. As in the case of the previously described forms of the invention, the direction of flow controlled may be in either direction. Also the adjacent ends of the poppet and the end member may be flat as illustrated or be inclined as dictated by design parameters desired.

Fig. 12 shows a simplification of structure of the general type shown in Figs. 1 through 5 in that the balance rod 90 is solid and serves as an abutment for the biasing spring 91 with an interposed O-ring 92 seated in a groove 93; the fluid flow path being along grooves along the sides of the stop member 94 and poppet 95. Balancing bias against pressure beyond the valve seat is derived through the bore 96 in the end of the poppet which conducts the pressure into the cavity occupied by the spring 91; said bore, if desired terminating in a plurality of angularly disposed ports 97.

Fig. 13 shows a simplified structure generally embodying the principles of the valve shown in Figs. 6 through 10 in the provision of a reverse flow accommodating check valve. The poppet 98 has an axial bore therein by which it is slidably mounted on balance rod 99 carried by the end member 100 and is provided with O-ring means 101 to prevent leakage. The rod 99 is hollow and contains the valve closing compression spring 102. The end member 100 at its outer end is provided with a bushing 103 which permits assembly of the check ball 104 and its spring 105; said ball engaging the seat formed at the end of the rod 99 and the bushing having an axial opening 106 therethrough to permit passage of fluid therethrough to the inlet side of the valve. The rod 99 is of the same outer diameter as the valve seat 107 and the poppet is provided with an axial port 107' extending from the distal end thereof to the bore engaging the rod. Thus as in the other forms of the invention, the pressure is separately balanced at both sides of the valve seat with respect to the pressure effect on the poppet. It will be obvious that the pressures on opposite sides of the closed valve may be widely different, but regardless of such differences, a relatively light spring is sufficient in all cases to effect seating of the poppet.

Referring finally to Fig. 14 there is shown a structure illustrating that the balancing principles heretofore described are not limited to solenoid operation. In the illustrated embodiment, a valve body 108 is provided with a port 109 communicating with one end of a valve chamber 110 at a side thereof; the other end of said valve chamber terminating in a valve seat 111. Extending from the opposite side of said valve seat is a second port 112. The end of the valve chamber adjacent the port 109 is closed by a screw plug 113 having a solid axially disposed balance rod 114 of the same diameter as the diameter of the valve seat 111 and slidably mounted on the rod 114 within the valve chamber is a poppet 115 having a conical face engaging the valve seat 111 under the influence of the compression spring 116 interposed between the end of the plug 113 and the adjacent end of the poppet. The poppet is provided with a port 117 leading from the axial bore 118 which engages the rod 114 and said port emerges in a plurality of branches 119 extending angularly from the axial line of the poppet member in the area of the conical face which is at the side of the valve seat remote from the valve chamber. The poppet is provided with gasket means 120 engaging the rod 114 to prevent leakage therebetween and the outer face of the poppet is provided with longitudinal channels or grooves 121 for fluid flow to or from the valve seat. The valve body is further provided with a bush rod 122 disposed in the axial line of the valve chamber and extending from the exterior of the valve body to the conical end of the poppet. A cam means including a handle 123 engages the opposite end of this rod and a gasket means 124 serves to prevent leakage at the point at which the rod extends through the wall of the valve body. Normally, the poppet is held closed by the spring 116 but upon operation of the push rod by the cam means, the poppet is unseated to permit fluid flow. As in the previously described forms of the invention, the pressures are separately maintained in balance at both sides of the valve seat, wherefore the valve will accommodate fluid flow in either direction and will prevent such flow when closed regardless of any pressure differential that may exist on opposite sides of the valve seat. It will be understood that the illustrated cam means for operating the poppet is merely by way of example and that many other modes of applying opening force to the valve may be employed so long as the described principle of balancing the pressures is preserved.

Thus there has been provided a valve structure which is able to operate with ease in the presence of high pressures and in the presence of extreme differential between pressures existing at opposite sides of the valve seat. Since the unseating force required is small, the operating parts therefor may be light in weight; all of which contributes to the provision of a valve particularly acceptable for use on aircraft hydraulic systems where light weight valves for extreme pressures are especially useful. The usefulness of the invention, however, is not limited to aircraft and the principles of the invention may be employed in all situations in which ease of operation, especially in the presence of extreme fluid pressure is a factor.

Attention is called also to the fact that the opening in the end of the poppet beyond the valve seat serves to inhibit the dynamic pressure effect which otherwise in the case of high pressure and high volume flow might operate to prevent the spring from closing the valve.

Accordingly the invention is not to be deemed to be limited to the modes of execution of presently preferred embodiments of the invention, and it will be understood that the invention includes all such changes and modifications in the parts and in the construction, combination and arrangement of parts as shall come within the purview of the appended claims.

I claim:

1. In a balanced valve, a valve body structure having a valve chamber, a valve seat at one end of said valve chamber, a first port communicating with the opposite end of said valve chamber, a second port communicating with the side of said valve seat opposite said valve chamber, a poppet mounted for reciprocation in said valve chamber into and out of engagement with said valve seat, fluid flow conducting means extending between said first port and said valve seat including a passageway in said poppet, said passageway having one of its ends in communication with said first port and the other one of its ends in communication with said valve seat and serving to conduct fluid between said second port and said first port when said poppet is moved out of engagement with said valve seat, spring means normally moving said poppet into engagement with said valve seat, separate pressure balancing means reacting on said poppet; said means including a pressure responsive area within said poppet exposed to pressure from said second port and having the same area as the area of the portion of the end face of said poppet exposed to pressure from said second port; said pressure areas being opposed to each other with resultant balancing of the effect of pressure in said second port on said poppet, and other means at the opposite end of said poppet reducing the area of said opposite end to the same area as that portion of the valve seat engaging end of said poppet disposed within the valve chamber when the poppet is engaging the valve seat with resultant balancing of the effect of pressure in said valve chamber on said poppet, and means for moving said poppet away from said valve seat in opposition to said spring means.

2. A balanced valve as claimed in claim 1 in which said last mentioned means includes a solenoid coil surrounding said valve chamber and in which said poppet is formed of paramagnetic material and is responsive to energization of said coil to move away from said valve seat in opposition to the bias of said spring means.

3. A balanced valve as claimed in claim 1 in which the means for moving said poppet away from said valve seat includes a manually operable handle disposed exteriorly of said valve body structure and means extending from said handle to the interior of said valve body structure and engaging said poppet.

4. A balanced valve as claimed in claim 1 in which said first port constitutes an inlet port and said second port constitutes an outlet port and in which a check valve means is provided effective to permit reverse flow through said valve while said poppet remains on said valve seat.

5. A balanced valve as claimed in claim 1 in which said balancing means in said second port comprises a cylindrical member projecting from the end of said valve chamber opposite said valve seat in the axial line of said valve seat, a first axial bore in said poppet slidably engaging said member; said member and bore having a diameter equal to the diameter of said valve seat, and a second axial bore in said poppet of lesser diameter than said first bore extending from the end of said poppet exposed to pressure in said second bore to said first bore.

6. A balanced valve as claimed in claim 1 in which the end of said valve chamber opposite said valve seat is provided with an axial bore of the same diameter as said valve seat and in which said poppet is provided with a cylindrical member slidingly fitting said bore, and a fluid channel extending axially through said poppet and said cylindrical member.

7. A balanced valve as claimed in claim 5 in which said cylindrical member projects beyond the end of said poppet remote from said valve seat and constitutes the means for reducing the area of said end of said poppet subject to pressure from said first port.

8. In a solenoid operated valve, a valve body structure having a cylindrical bore extending therein; said body structure surrounding and supporting a solenoid coil disposed exteriorly and coaxially of said bore and said body structure being formed of paramagnetic material except for a ring of non-magnetic material disposed at the mid length of said coil and forming a portion of said bore, a paramagnetic end member having a fluid passage extending therethrough mounted in one end of said bore and terminating adjacent the mid length of said non-magnetic ring portion and constituting a fixed pole piece of the electromagnet formed by energization of said coil, a valve seat disposed at the other end of said bore and combining with said end member to define a valve chamber, a paramagnetic poppet mounted for reciprocation in said valve chamber between said end member and said valve seat and constituting a movable pole piece of said electromagnet, spring means normally urging said poppet into engagement with said valve seat with resultant formation of a working gap between said pole pieces, means for conducting fluid flow between the fluid passage in said end member and said valve seat including a fluid passageway in said poppet, said passageway having one of its ends in communication with said fluid passage and the other one of its ends in communication with said valve seat and serving to conduct fluid between said valve seat and said fluid passage when said poppet is moved out of engagement with said valve seat, a fluid passage extending from the side of said valve seat opposite the side engaged by said poppet to the exterior of said valve body structure, and means for separately balancing the effects of fluid pressures on said poppet entering said valve body through said passage in said end member and through said passage at said opposite side of said valve seat.

9. A balanced valve as claimed in claim 8 in which said balancing means responsive to fluid pressures deriving from said passage at said opposite side of said valve seat comprises a cylindrical member of the same diameter as said valve seat projecting into said valve chamber from said end member and closely slidably engaging a bore in said poppet and a second bore in said poppet extending from the portion thereof exposed to pressure in said passage at said opposite side of said valve seat and communicating with said first named bore in said poppet.

10. A balanced valve as claimed in claim 8 in which said end member is mounted for adjustment axially of said bore in said body structure with resultant capacity for variation of the working gap of said electro-magnet.

11. A balanced valve as claimed in claim 9 in which said cylindrical member is formed of non-magnetic material and is provided with an axial bore in which said spring means is housed.

12. A balanced valve as claimed in claim 9 in which said cylindrical member is formed of non-magnetic material and is provided with an axial bore extending therethrough; a portion of said bore adjacent the end of said cylindrical member disposed within said end member being of reduced diameter and said spring means comprising a compression spring housed within said bore and at one end engaging the shoulder formed by said reduced diameter bore and at its other end engaging the end of said bore in said poppet, and spring biased check valve means normally closing said bore in said cylindrical member against fluid flow through said poppet and said cylindrical member from passage at said opposite side of said valve seat.

13. A balanced valve as claimed in claim 9 in which said end member is provided with an axial bore extending therethrough in which one end of said cylindrical member is mounted, and in which said cylindrical member is provided with an axial bore extending therethrough including a reduced diameter portion disposed within said end member forming a check valve seat, a valve element normally engaging said valve seat in said cylindrical member, an abutment closing the outer end of said bore in said end member, a spring interposed between said valve element and said abutment and effective normally to maintain said valve element closed and a port extending from said bore in said end member beyond the end of said cylindrical member to the exterior of said end member.

14. In a balanced, solenoid operated valve, a valve body structure having a cylindrical bore extending therethrough, an inlet port at one end of said bore, an outlet port at the other end of said bore a valve seat within said bore adjacent said outlet bore, an end member within said bore and extending from a point adjacent said inlet port to the midlength of said bore and combining with said valve seat to define a valve chamber, a poppet formed of paramagnetic material mounted for reciprocation in said valve chamber between said end member and said valve seat, spring means extending between said end member and said poppet normally urging said poppet into engagement with said valve seat, means for conducting fluid flow from said inlet port to said valve seat comprising a plurality of aligned grooves extending longitudinally of the exteriors of said end member and said poppet, means for effecting pressure balance on said poppet with respect to fluid pressure derived from said inlet port, other means separately effecting pressure balance on said poppet with respect to pressure derived from said outlet port, and a solenoid coil surrounding said valve body and disposed coaxially with respect to said valve chamber effective upon energization to move said poppet away from said valve seat in opposition to the bias of said spring means.

15. In a solenoid operated valve, a valve body structure having a cylindrical bore therein; said body structure surrounding and supporting a solenoid coil disposed exteriorly and coaxially of said bore and said body structure being formed of paramagnetic material except for a ring of non-magnetic material disposed at the mid-length of said coil and forming a portion of said bore, said body structure further including an end member having a fluid passage extending therethrough extending into said coil and terminating within said ring adjacent the mid-length of said ring and constituting a fixed pole piece of the electro-magnet formed by energization of said coil, a paramagnetic pole piece reciprocable in said bore toward and away from said fixed pole piece, means normally urging said movable pole piece away from said fixed pole piece, a second fluid passage communicating with the end of said bore remote from said first named fluid passage, a valve seat interposed between said bore and said second fluid passage, a valve member movable by movement of said movable pole piece into and out of engagement with said valve seat, and devices cooperating with said valve member effective when said valve member is engaged with said valve seat, to separately balance the effect of pressures at opposite sides of said valve seat on said valve member.

References Cited in the file of this patent

UNITED STATES PATENTS

| 566,108 | Wood | Aug. 18, 1896 |
| 2,279,243 | Parsons | Apr. 7, 1942 |
| 2,307,949 | Phillips | June 12, 1943 |
| 2,543,455 | Goepfrich | Feb. 27, 1951 |
| 2,554,390 | Stevenson | May 22, 1951 |
| 2,623,541 | Seppmann | Dec. 30, 1952 |
| 2,638,118 | Chandler | May 12, 1953 |
| 2,638,119 | Baird | May 12, 1953 |
| 2,781,997 | Berck | Feb. 19, 1957 |